United States Patent [19]

Nakane et al.

[11] Patent Number: 5,140,427
[45] Date of Patent: Aug. 18, 1992

[54] APPARATUS FOR DISPLAYING AN IMAGE ON A SCREEN

[75] Inventors: Yasuaki Nakane; Hiroshi Nakayama; Susumu Sakamoto, all of Miyagi, Japan

[73] Assignee: Sony Corporation, Tokyo, Japan

[21] Appl. No.: 450,628

[22] Filed: Dec. 14, 1989

[30] Foreign Application Priority Data

Dec. 23, 1988 [JP] Japan ............................... 63-324875
Jul. 11, 1989 [JP] Japan ............................... 1-178589

[51] Int. Cl.$^5$ ............................................. H04N 5/74
[52] U.S. Cl. .................................. 358/231; 358/206; 358/235
[58] Field of Search ............... 358/231, 235, 232, 206, 358/60, 63

[56] References Cited

U.S. PATENT DOCUMENTS

| | | | |
|---|---|---|---|
| 3,894,182 | 7/1975 | Yamamoto et al. | |
| 4,024,341 | 5/1977 | Takahashi | 358/206 |
| 4,143,403 | 3/1979 | Ohnishi | 358/206 |
| 4,761,660 | 8/1988 | Lee | |
| 4,943,871 | 7/1990 | Miyagawa | 358/206 |

FOREIGN PATENT DOCUMENTS

0159024 10/1985 European Pat. Off. .

Primary Examiner—Tommy P. Chin
Attorney, Agent, or Firm—Philip M. Shaw, Jr.

[57] ABSTRACT

A display apparatus having a screen, a light beam source for generating light beams, an optical modulator for modulating the light beams in accordance with image signals to be displayed, a scanning apparatus for generating scanning beams of the modulated light beams, a projection apparatus for projecting the scanning beams on the screen, a reference beam source for generating a reference beam to be supplied to the scanning apparatus, a circuit for deriving a scanning reference beam, a circuit for generating timing signals based on the derived scanning reference beams, and a circuit for controlling timings of the image signals to be supplied to the optical modulator.

10 Claims, 5 Drawing Sheets

APPARATUS FOR DISPLAYING AN IMAGE ON A SCREEN

BACKGROUND OF THE INVENTION

1. Field of the Invention

The present invention relates to a display apparatus for displaying an image on a screen.

2. Description of the Prior Art

FIG. 1 shows an example of a known projection type raster-scan system display apparatus of utilizing laser beams to display an image on a projection screen.

Referring to FIG. 1, laser light sources 1R, 1G and 1B generate red, green and blue laser beams, respectively. The red, green and blue laser beams emitted from these laser light sources 1R, 1G and 1B are respectively supplied to optical modulators 2R, 2G and 2B. Red, green and blue primary color signals R, G and B are respectively supplied to the optical modulators 2R, 2G and 2B for modulating laser beams, wherein the red, green and blue laser beams are modulated in intensity (luminous intensity) by the color signals R, G and B, respectively.

The laser beams, modulated in intensity by the optical modulators 2R, 2G and 2B, are respectively supplied through lenses 3R, 3G and 3B to dichroic mirrors 4R, 4G and 4B, in which they are mixed to provide a single display laser beam Lw. Laser beam Lw is supplied to a polygon mirror 11 for horizontal deflection. The above-mentioned lenses 3R, 3G and 3B are used to adjust beam spots of the laser beams. Dichroic mirrors 4R, 4G and 4B are used to reflect laser beams of corresponding colors and to pass laser beams of different colors therethrough.

The polygon mirror 11 is formed as, for example, a regular icosipentahedron cylinder and the surface thereof is finished by a mirror-grinding process. A motor 12 is adapted to rotate the polygon mirror 11 at a revolution frequency of 1/25 of the horizontal frequency of each of the signals R, G and B in synchronism with a horizontal synchronizing pulse so that the laser beam Lw is horizontally deflected 25 times per revolution of the polygon mirror 11.

The laser beam Lw is collimated by a first relay lens (i.e. cylindrical lens) 13, and the collimated beam is supplied to a second cylindrical lens 14 having the same focal length as that of the first cylindrical lens 13, in which a reflection point of the polygon mirror 11 is focused at the focus position of the second cylindrical lens 14. A galvano mirror 15 is located at the above-mentioned focus position to vertically deflect the laser beam. A galvano motor 16 is adapted to vibrate the galvano mirror 15 at a vertical frequency of each of the signals R, G and B in synchronism with a vertical synchronizing pulse. Therefore, the laser beam Lw is vertically deflected by the galvano mirror 15 in the direction at a right angle to the direction in which the polygon mirror 11 horizontally deflects the laser beam Lw.

The laser beam Lw, horizontally and vertically deflected, is projected through a projection lens 17 on the rear surface of a flat screen 18. The projection lens 17 is employed to increase the resolution of the laser beam Lw by decreasing the beam spot of the laser beam Lw on the screen 18. The screen 18 is of such a type that an image projected on the rear surface thereof can be seen from its front side. Thus, a color image of signals R, G and B is displayed on the screen 18, when it is seen from its front surface.

While the above-mentioned polygon mirror 11 is rotated at an equal angular velocity, assuming the screen 18, for example, is flat, the laser beam Lw does not horizontally scan the screen 18 at an equal velocity. As a result, a rotation angle $\theta$ of the polygon mirror 11 and the horizontal scanning position of the laser beam Lw satisfy a relationship expressed by tan $\theta$, causing linearity in the horizontal direction of the image displayed on the screen 18 to deteriorate particularly at the left and right end portions of the screen 18.

In order to solve the above-mentioned problem, it has been proposed to correct linearity in the horizontal direction of the image displayed on the screen 18 by controlling the rotary phase of the horizontal deflection polygon mirror 11 during the horizontal scanning period, similarly to a television receiver in which linearity in the horizontal direction of an image is corrected by correcting the waveform of a horizontal deflection signal.

The polygon mirror 11 must operate with high precision. Therefore, the polygon mirror 11 is made of a material such as aluminum and the like and is finished by a mirror-grinding process. Accordingly, the polygon mirror 11 has a large mass and its rotation frequency is 1/25 of the horizontal frequency of the signals R, G and B, i.e. the rotation speed is as high as about 630 r.p.s. Thus, in practice, even if the polygon mirror 11 could be rotated in synchronism with the horizontal synchronizing pulse of the signals R, G and B, the rotary phase of the polygon mirror 11 could not be adequately controlled during one horizontal scanning period in practice. It is therefore impossible to correct the linearity of the image displayed on the screen 18 by controlling the rotary phase of the polygon mirror 11 during the horizontal scanning period.

It is to be noted that when the scanning screen is as small as that of a laser-type printer, the non-linearity in the horizontal direction of the image can be corrected by a correcting lens. However, when the screen is large as in a laser display apparatus, it is impossible to correct the non-linearity in the horizontal direction of the image on the screen by using a correcting lens.

OBJECTS AND SUMMARY OF THE INVENTION

Accordingly, it is an object of the present invention to provide an improved display apparatus which can eliminate the defects encountered with the prior art.

More specifically, it is an object of the present invention to provide a display apparatus in which a non-linearity in the horizontal direction of an image on the screen can be corrected.

It is another object of the present invention to provide a display apparatus in which an image displayed on the screen can be prevented from fluctuating.

It is still another object of the present invention to provide a display apparatus in which a horizontal scanning starting position of an image to be displayed on a screen can be prevented from being affected by inaccuracy in the manufacturing process and an irregular rotation of a polygon mirror.

It is still another object of the present invention to provide a display apparatus in which a jitter component of a color signal can be prevented from being displayed on the screen.

It is a further object of the present invention to provide a display apparatus in which non-linearity of an image can be corrected even when a screen is arranged to have a certain curvature.

It is a further object of the present invention to provide a display apparatus in which non-linearity of image can be corrected even when a screen is as wide as that which is used for high definition television signals.

According to an aspect of the present invention, there is provided a display apparatus comprising:

(a) an image display screen having a horizontal range and contour;

(b) a light beam source for generating light beams;

(c) modulation means for modulating said light beams in accordance with image signals to be displayed;

(d) scanning means for generating scanning beams of said modulated light beams;

(e) projection means for projecting said scanning beams on said screen;

(f) a reference beam source for generating a reference beam to be supplied to said scanning means;

(g) means for deriving the scanning reference beam from said scanning means;

(h) means for generating timing signals based on said derived scanning reference beams, the timing signal generating means including a reference pattern plate positioned in the path of the derived reference beam and having a plurality of light transmission portions arranged to have a pitch corresponding to the horizontal range and contour of the screen; and (i) means for controlling timings of said image signals to be supplied to said modulation means.

The above, and other objects, features and advantages of the present invention, will be apparent in the following detailed description of preferred embodiments when read in conjunction with the accompanying drawings, in which like reference numerals are used to identify the same or similar parts in the several views.

DETAILED DESCRIPTION OF PREFERRED EMBODIMENTS

The present invention will now be described with reference to the drawings.

Figure 1:
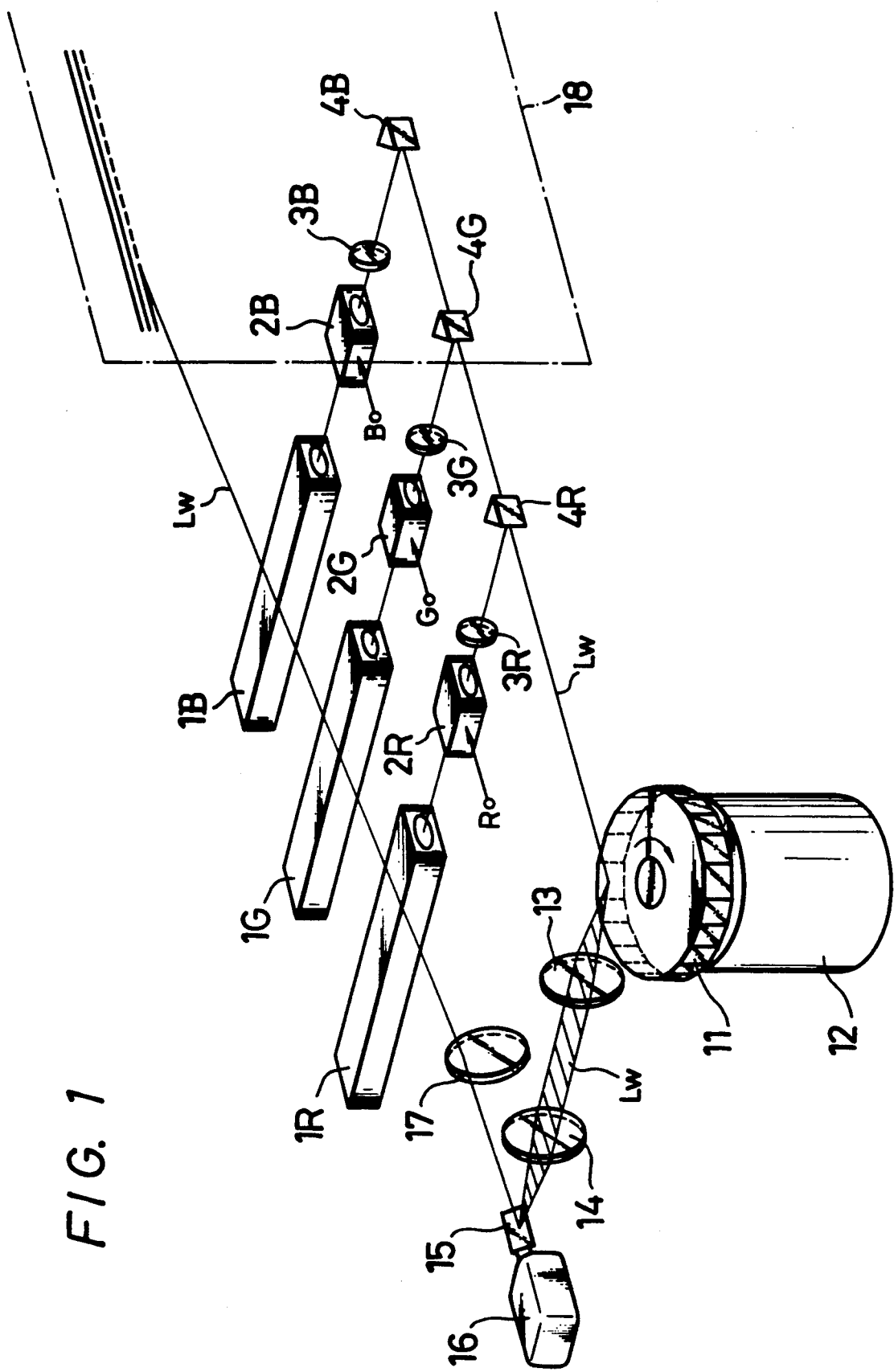
FIG. 1 is a perspective view of an overall or general arrangement of a prior art projection-type raster-scan system display apparatus to which the present invention can be advantageously applied.
Figure 2:
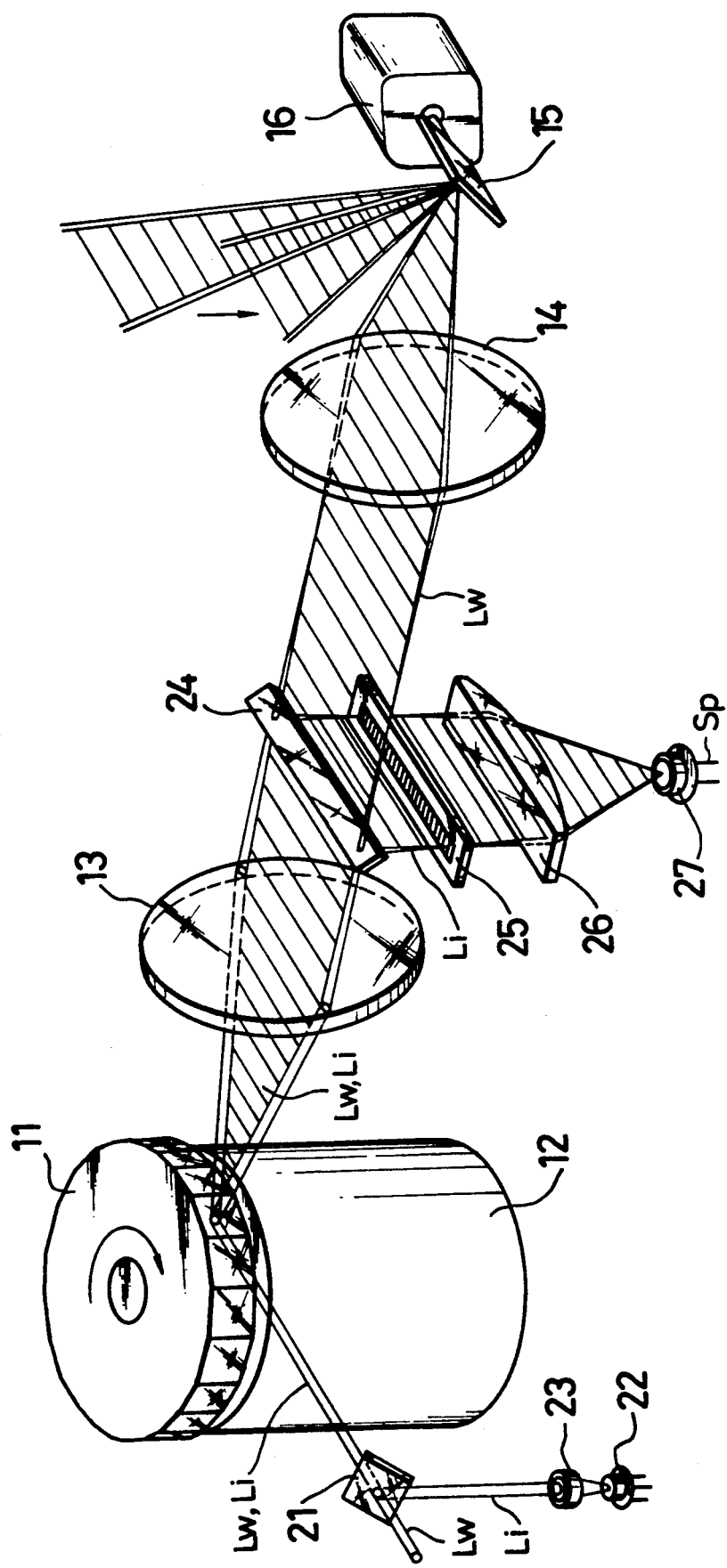
FIG. 2 is a perspective view showing a main portion of a display apparatus according to an embodiment of the present invention.

FIG. 2 is a perspective view showing an example of a main portion of an optical system of the display apparatus according to the present invention. In FIG. 2, like parts corresponding to those of FIG. 1 are marked with the same reference numbers and therefore need not be described in detail.

FIG. 2 illustrates a portion of the optical system of the present invention in which the laser beam Lw is introduced into or derived from the polygon mirror 11.

Referring to FIG. 2, a dichroic mirror 21 is located on the optical path of the laser beam Lw traveling between the dichroic mirror 4R (not shown) and the polygon mirror 11. The dichroic mirror 21 reflects infra-red laser beams and permits the laser beam Lw to travel therethrough. An infra-red laser light source 22 is provided to generate a reference infra-red laser beam Li. The reference infra-red laser beam Li is supplied through a collimator lens 23 to the dichroic mirror 21, in which it is mixed with the display laser beam Lw from the dichroic mirror 4R.

Therefore, the laser beams derived from the polygon mirror 11 include the laser beam Li, and this laser beam Li is horizontally deflected similarly to the laser beam Lw.

A dichroic mirror 24 is located on the optical path of the laser beams (including the beam Li) traveling between the cylindrical lenses 13 and 14. The dichroic mirror 24 reflects the infra-red laser beam and to permit the laser beam Lw to pass therethrough similarly to the dichroic mirror 21. The dichroic mirror 24 separates the original display laser beam Lw and the reference laser beam Li, whereby the laser beam Lw is directly supplied to the cylindrical lens 14 as described above, and the reference laser beam Li is supplied to a reference pattern plate 25. The reference pattern plate 25 will be described below with reference to FIGS. 4A and 4B.

Figure 4A:
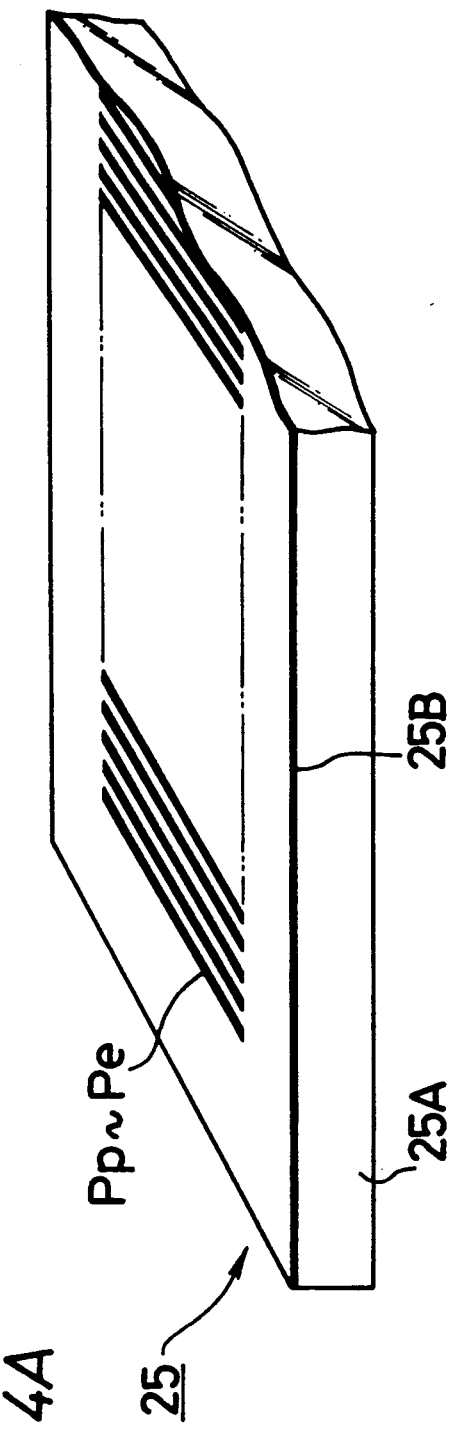
FIG. 4A is a perspective view of a portion of the present invention, to which reference will be made in explaining a reference pattern plate used in the present invention.
Figure 4B:
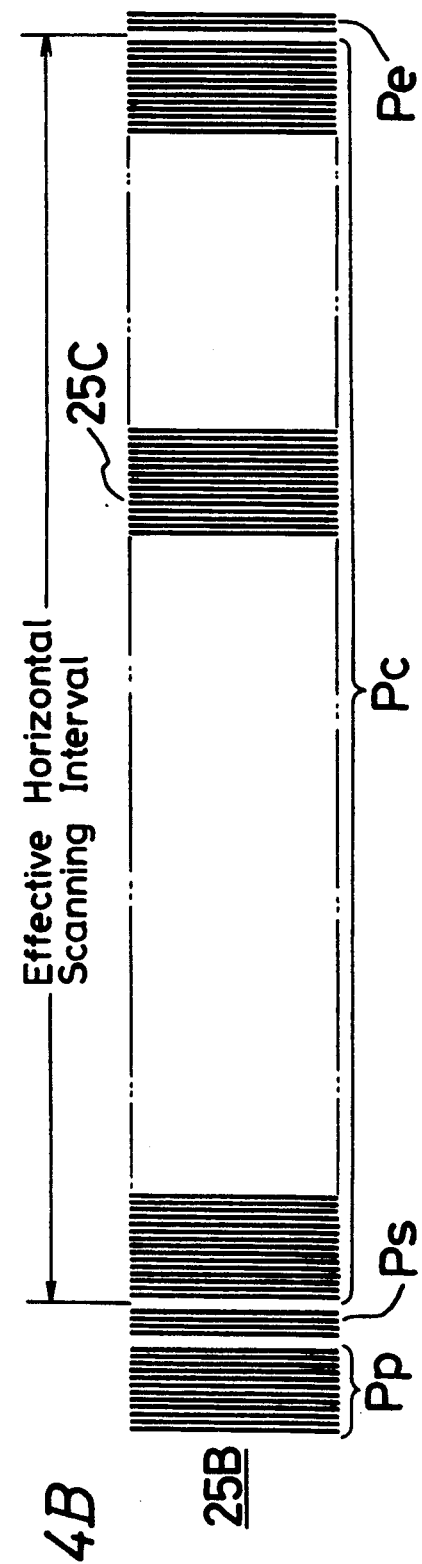
FIG. 4B is a planar view of the reference pattern plate of FIG. 4A.

As shown in FIGS. 4A and 4B, the reference pattern plate 25 is comprised of a rectangular transparent glass substrate 25A and a light-shielding film 25B formed on the transparent glass substrate 25A. The light-shielding film 25B has formed on the surface thereof light transmission patterns Pp, Ps, Pc and Pe in a predetermined shape. For example, the light-shielding film 25B is formed by a vacuum film growing-process of a metal layer such as a Cr, Ti or Ni layer so that it is sufficiently thick to be impervious to the reference laser beam Li. The light-shielding film 25B is treated by a photo-etching process to form the patterns Pp, Ps, Pc and Pe therethrough.

The patterns Pp, Ps, Pc and Pe have a plurality of straight-line light transmission portions 25C aligned in the length direction of the substrate 25A. The width of each of the patterns Pp to Pe (taken in the aligned direction thereof) is selected to be equal to or a little smaller than the horizontal scanning width of the laser beam Li separated by the dichroic mirror 24.

The pattern Pc is employed to obtain a clock signal upon the horizontal scanning. In the pattern Pc, as shown in FIG. 4B, the light transmission portions 25C are formed at equal intervals over a range corresponding at least to the effective horizontal scanning range of the screen 18 and also in response to a curvature of the screen 18 in the horizontal direction. The number of the light transmission portions 25C in the pattern Pc is selected so that its integral multiple is equal to the number of pixels (i.e. picture elements) in one horizontal line, for example, 910 pixels.

The start pattern Ps is employed to detect the starting time point of the effective horizontal scanning by the beam Li, thereby designating a starting time point at which the beam Lw, modulated by the signals R, G and B, starts scanning. The start pattern Ps is formed such that the light transmission portions 25C are spaced apart from the horizontal scanning starting side of the clock pattern Pc by a distance equivalent to one light transmission portion 25C and with an equal pitch, keeping a regular alignment of the light transmission portions 25C of the clock pattern Pc.

The pattern Pp is the pre-amble pattern for phase-locking of the PLL (phase locked loop) which will be described later. The pre-amble pattern Pp is formed so that the light transmission portions 25C are spaced apart from the start pattern Ps by a distance equivalent to one light transmission portion 25C in the horizontal scanning start side of the start pattern Ps, and with an equal pitch, keeping a regular arrangement of the light transmission portions 25C of the clock pattern Pc.

The end pattern Pe is employed to specify the modulation ending time point of the beam Lw by the signals R, G and B by detecting the ending time point of the effective horizontal scanning by the beam Li. The end pattern Pe is formed so that the light transmission portions 25C are spaced apart from the horizontal scanning ending side of the clock pattern Pc by a distance equivalent to one light transmission portion 25C, and with an equal pitch and in the same regular arrangement as the light transmission portions 25C of the clock pattern Pc.

Referring to FIG. 2, the reference pattern plate 25 is located at the focus position of the cylindrical lens 13 for the laser beam Li. The horizontal scanning direction of the laser beam Li is in the same direction as the direction in which the patterns Pp to Pe are aligned.

Thus, the patterns Pp to Pe are horizontally scanned by the laser beam Li so that the reference pattern plate 25 modulates the intensity of the laser beam Li in response to the horizontal scanning.

The beam Li passes through the reference pattern plate 25 and through a converging lens 26 to a photo-sensor 27. The photo-sensor 27 derives a pulse signal Sp which goes to high or low level in response to the change of intensity of the laser beam Li due to the reference plate 25, i.e. an alternate signal Sp whose frequency and phase are corresponding to the change of the intensity of the laser beam Li.

The frequency and phase (leading edge and trailing edge) of the signal Sp correspond to the horizontal scanning positions at which the laser beam Li horizontally scans the reference pattern plate 25. Further, the horizontal scanning position at which the laser beam Li horizontally scans the reference pattern plate 25 corresponds to the horizontal scanning position at which the laser beam Lw horizontally scans the screen 18. Accordingly, the frequency and phase (leading edge and trailing edge) of the signal Sp correspond to the horizontal scanning positions when the laser beam Lw horizontally scans the screen 18.

Therefore, when the timebases of the signals R, G and B supplied to the optical modulators 2R, 2G and 2B are controlled by the alternate signal Sp at every horizontal period, it is possible to correct the linearity in the horizontal direction of the image to be displayed on the screen 18.

Figure 3:
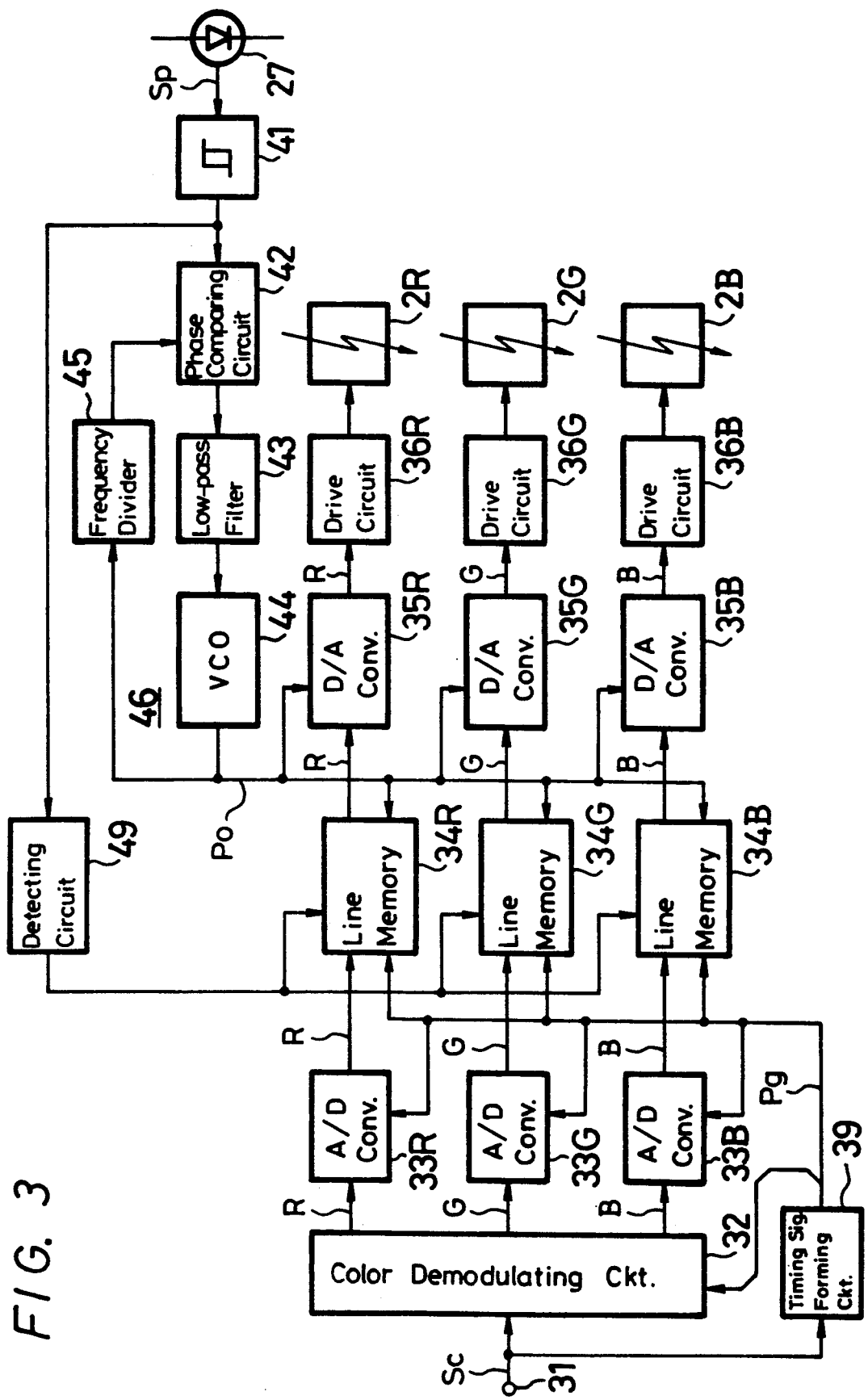
FIG. 3 is a block diagram of a circuit arrangement of the display apparatus according to the present invention.

FIG. 3 shows an example of a correcting circuit which corrects the linearity in the horizontal direction of the image to be displayed on the screen 18 by the above-mentioned method.

In FIG. 3, it will be seen that a color composite video signal Sc applied to a terminal 31 is supplied to a timing signal forming circuit 39, from which there are derived various timing signals necessary for the succeeding signal processings on the basis of a vertical synchronizing pulse, a horizontal synchronizing pulse and a burst signal. The video signal Sc is also supplied to a color demodulating circuit 32, and a color subcarrier signal from the forming circuit 39 is supplied to the color demodulating circuit 32, in which the video signal Sc is demodulated to provide the color signals R, G and B. These color signals R, G and B are respectively supplied to analog-to-digital (A/D) converters 33R, 33G and 33B, and a clock pulse Pg having a frequency of, for example, four times the color subcarrier frequency fc is supplied from the forming circuit 39 to the A/D converters 33R, 33G and 33B, in which the color signals R, G and B are converted to digital signals.

The digital signals R, G and B are respectively supplied to line memories 34R, 34B and 34G, and the clock pulse Pg from the forming circuit 39 is supplied to the line memories 34R, 34B and 34G as a write clock pulse. Thus, the signals R, G and B are sequentially written in the line memories 34R, 34G and 34B by 910 pixels each at every horizontal period. Assuming that fh is a horizontal frequency, then the following equality will be established:

$$4fc = 910 \, fh$$

Further, the signal Sp from the photo-sensor 27 is supplied through a waveform shaping circuit 41 to a phase comparing circuit 42 as a first comparing input. This phase comparing circuit 42 and succeeding circuits 43, 44 and 45 constitute a phase locked loop (PLL) 46 for frequency multiplication. A compared output from the phase comparing circuit 42 is supplied through the low-pass filter 43 to the voltage controlled oscillator (VCO) 44 as a control signal. An oscillation signal Po from the VCO 44 is supplied to the frequency divider 45, in which it is frequency-divided to have a frequency equal to that of the signal Sp. The frequency-divided output is supplied to the phase comparing circuit 42 as a second comparing input.

Therefore, the oscillation frequency and phase of the VCO 44 are changed following the frequency and phase of the signal Sp. The average oscillation frequency of the VCO 44 is selected to be 4fc which is equal to the frequency of the pulse Pg.

The oscillation signal Po is supplied to the line memories 34R, 34G and 34B as a read clock. The signal Sp from the waveform shaping circuit 41 is supplied to a start pattern detecting circuit 49 which derives, when the beam Li horizontally scans the start pattern Ps, a scan start signal. This scan start signal is supplied to the line memories 34R, 34G and 34B as a read start signal.

Accordingly, when the laser beam Li starts scanning the pattern Pc in the horizontal direction, the reading of the signals R, G and B from the line memories 34R, 34G and 34B is started. Then, the signals R, G and B are sequentially read from the line memories 34R, 34G and 34B in synchronism with the signal Po. In other words, the signal R, G and B are read out in synchronism with the horizontal scanning of the pattern Pc by the laser beam Lw. Consequently, the signals R, G and B are read from the line memories 34R, 34G and 34B in synchronism with the horizontal scanning operation of the laser beam Lw on the screen 18.

The detecting circuit 49 derives a scan end signal when the laser beam Li horizontally scans the end pattern Pe. The scan end signal is supplied to the line memories 34R, 34G and 34B as a read end signal Se, wherein when supplied, the reading from the line memories 34R, 34G and 34B in that horizontal period ends.

Then, the signals R, G and B read from the line memories 34R, 34G and 34B, are respectively supplied to digital-to-analog (D/A) converters 35R, 35G and 35B, and the signal Po is supplied to the D/A converters 35R, 35G and 35B as a clock pulse. Thus, the signals R, G and B are re-converted to the original analog signals R, G and B. The analog signals R, G and B are respectively supplied through driving circuits 36R, 36G and 36B to the modulators 2R, 2G and 2B as modulated inputs, thereby displaying on the screen 18 a color image of the composite color video signal Sc.

The color image is displayed on the screen 18 by the laser beam Lw as described above. According to the present invention, the reference laser beam Li is mixed with the display laser beam Lw, and the horizontal scanning position of the display laser beam Lw is detected by the reference laser beam Li and the reference pattern plate 25. Also, the timebases of the signals R, G and B are controlled in response to the detected horizontal scanning position. Therefore, the image displayed on the screen 18 is prevented from being distorted and the linearity of the display is excellent.

According to the present invention, in particular, since the reference pattern plate 25 is provided with the pre-amble pattern Pp, the frequency-multiplication PLL 46 is pre-excited by the pre-amble pattern Pp. Thus the signal Sp can be stably formed relative to the succeeding start pattern Ps and clock pattern Pc.

Further, since the start pattern signal Sp is provided just before the clock pattern Pc as a reference for reading the signals R, G and B from the line memories 34R, 34G and 34B, the starting position of the horizontal scanning for the image to be displayed on the screen 18 is prevented from being affected by the inaccuracies of the manufacturing process and the irregular rotation of the polygon mirror 11.

Further, a jitter component, even if it is included in the color video signal Sc is absorbed by the line memories 34R, 34G and 34B, so that the jitter component can be prevented from being displayed on the screen 18.

Furthermore, by forming the patterns Pp and Ps on the reference pattern plate 25, it is possible to improve the generation and stability of the signal Sp or pulse Po.

In addition, when a projection-type television receiver is formed from the laser light sources 1R, 1G and 1B to the screen 18 as one body, a wide angle lens has to be provided between the galvano mirror 15 and the screen 18 in order to reduce the depth of the television receiver. Also, by arranging the light transmission portion 25C of the clock pattern Pc of the reference pattern plate 25 to have a pitch corresponding to that wide angle lens, it is possible to correct the linearity of the image on the screen 18.

Further, when the screen 18 is not flat and has a certain curvature, by arranging the light transmission portion 25C of the clock pattern Pc of the reference pattern plate 25 to have a pitch corresponding to the curvature of the screen 18, it is possible to correct the non-linearity of the image to be displayed on the screen 18. Furthermore, regardless of the wide screen of a high definition television receiver (HDTV), it is possible to correct the non-linearity of the image with ease.

Figure 5:
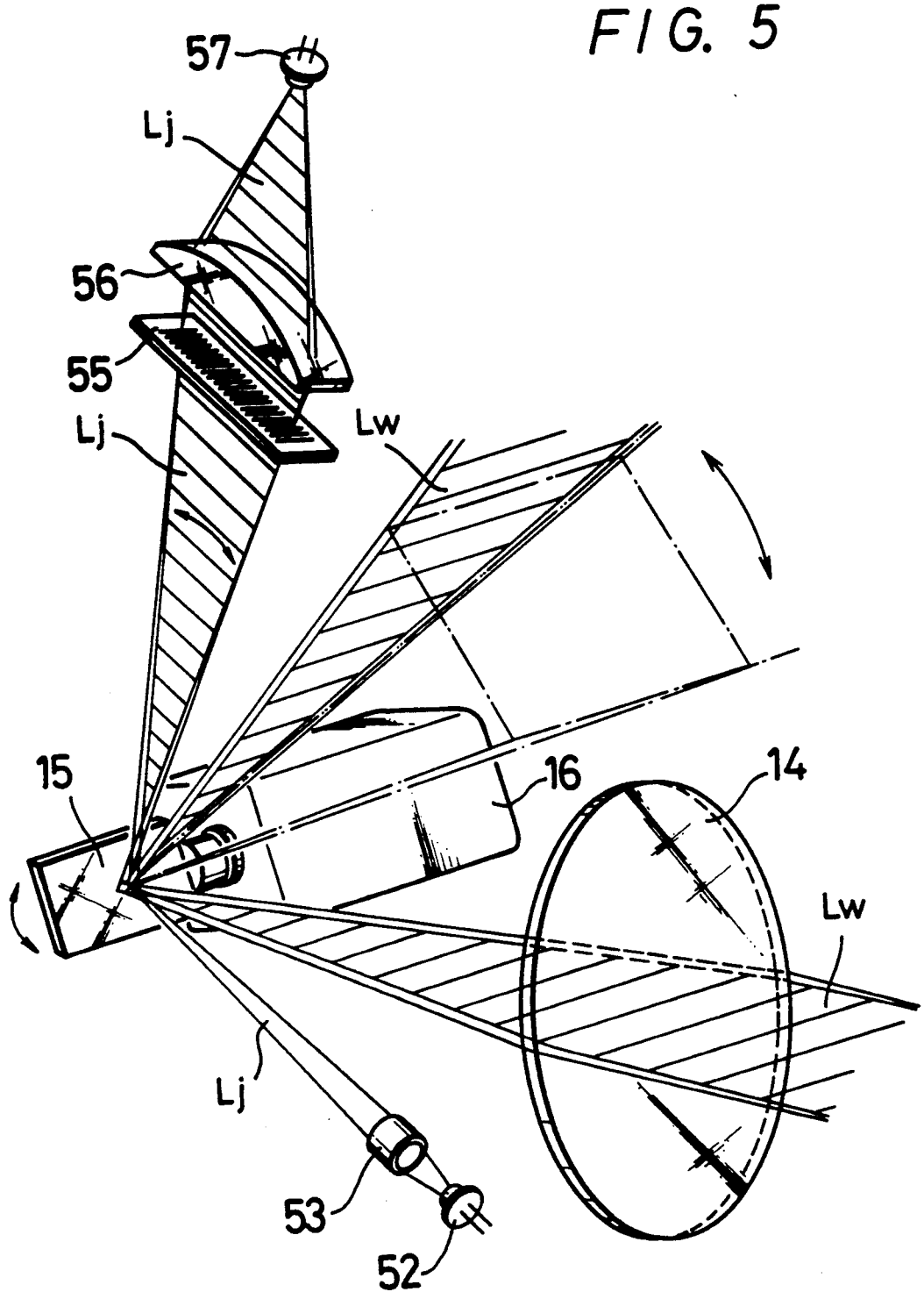
FIG. 5 is a perspective view showing the display apparatus according to another embodiment of the present invention.

FIG. 5 shows a perspective view of another embodiment of the present invention in which the non-linearity of the vertical deflection can be corrected. In FIG. 5, like parts corresponding to those of FIG. 2 are marked with the same reference numbers and therefore will not be described in detail.

Referring to FIG. 5, an infra-red laser light source 52 is provided. The infra-red laser light source 52 derives a reference infra-red laser beam Lj. The laser beam Lj is collimated by a collimator lens 53 and is then introduced to the galvano mirror 15 at an incident angle different from that of the laser beam Lw from the cylindrical lens 14. The reflected laser beam Lj is supplied through a reference pattern plate 55 and a converging lens 56 to a photo-sensor 57.

The reference pattern plate 55 is formed similarly to the reference pattern plate 25, and the laser beam Lj is just vertically deflected by the galvano mirror 15 and is then fed to the reference pattern plate 55. Therefore, if, for example, the driving motor 16 of the galvano mirror 15 is controlled by the output from the photo-sensor 57, it is possible to correct the linearity in the vertical direction of the image displayed on the screen 18, provided frame memories are used in the signal processing circuit instead of line memories 34R, 34G and 34B in FIG. 3.

Having described preferred embodiments of the invention in detail with reference to the accompanying drawings, it is to be understood that the present invention is not limited to those precise embodiments and that many changes and modifications could be effected by one skilled in the art without departing from the spirit and scope of the novel concepts of the invention as defined in the appended claims.

We claim as our invention:

1. A display apparatus comprising:
   (a) an image display screen having a horizontal range and contour;
   (b) a light beam source for generating light beams;
   (c) modulation means supplied with image signals to be displayed for modulating the light beams in accordance with the image signals;
   (d) scanning means for generating a scanning beam from the modulated light beams;
   (e) projection means for projecting the scanning beam on the screen;
   (f) a reference beam source for generating a reference beam which is supplied to the scanning means to thereby generate a scanning reference beam;
   (g) means for generating timing signals based on the scanning reference beam, the timing signal generating means including a reference pattern plate positioned in the path of the scanning reference beam and having a plurality of light transmission portions arranged to have a pitch corresponding to the horizontal range and contour of the screen; and
   (i) means supplied with the timing signals for controlling the timings of the image signals supplied to the modulation means.

2. A display apparatus as cited in claim 1, wherein the reference pattern plate includes a start pattern and a clock pattern following the start pattern.

3. A display apparatus as cited in claim 1, wherein the timing signal generating means further includes detector means for detecting the scanning reference beam projected on the reference pattern plate.

4. A display apparatus as cited in claim 2, wherein the timing signal generating means includes detector means for detecting the scanning reference beam projected on the reference pattern plate and generating a start pulse and a following clock pulse.

5. A display apparatus as cited in claim 4, further comprising image memory means for storing the image signals, and the start pulse and the clock pulse are supplied to the image memory means to control the rate at which the image signals are read out from the memory means to the modulation means.

6. The display apparatus of claim 1 wherein the screen has a plurality of horizontal lines, each line having a plurality of pixels, the number of light transmission portions in the reference pattern plate being an integral multiple of the number of pixels in one horizontal line.

7. The display apparatus of claim 1 further comprising a first dichroic mirror positioned between the light beam source and the scanning means for combining the light beams with the reference beam, wherein the means for deriving the scanning reference beam includes a second dichroic mirror for splitting the scanning reference beam away from the path of the light beams and onto the reference pattern plate.

8. The display apparatus of claim 1 wherein the horizontal contour of the screen is substantially flat.

9. The display apparatus of claim 1 wherein the horizontal contour of the screen is curved.

10. A display apparatus comprising:

(a) an image display screen having a vertical range and contour;
(b) a light beam source for generating light beams;
(c) modulation means supplied with image signals to be displayed for modulating the light beams in accordance with the image signals;
(d) scanning means for generating a scanning beam from the modulated light beams;
(e) projection means for projecting the scanning beam on the screen;
(f) a reference beam source for generating a reference beam which is supplied to the scanning means to thereby generate a scanning reference beam;
(g) means for generating timing signals based on the scanning reference beam, the timing signal generating means including a reference pattern plate positioned in the path of the scanning reference beam and having a plurality of light transmission portions arranged to have a pitch corresponding to the vertical range and contour of the screen; and
(i) means supplied with the timing signals for controlling the timings of the image signals supplied to the modulation means.

* * * * *